US009405292B2

(12) United States Patent
Nagasawa

(10) Patent No.: US 9,405,292 B2
(45) Date of Patent: Aug. 2, 2016

(54) DELIVERY VEHICLE AND METHOD AND PROGRAM FOR CONTROLLING DRIVE OF DELIVERY VEHICLE

(71) Applicant: MURATA MACHINERY, LTD., Kyoto-shi, Kyoto (JP)

(72) Inventor: Atsuo Nagasawa, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 14/767,616

(22) PCT Filed: Dec. 13, 2013

(86) PCT No.: PCT/JP2013/083455
§ 371 (c)(1),
(2) Date: Aug. 13, 2015

(87) PCT Pub. No.: WO2014/125719
PCT Pub. Date: Aug. 21, 2014

(65) Prior Publication Data
US 2016/0004252 A1 Jan. 7, 2016

(30) Foreign Application Priority Data

Feb. 15, 2013 (JP) ................................ 2013-027727

(51) Int. Cl.
*G05D 1/00* (2006.01)
*G05D 1/02* (2006.01)
*G05B 19/418* (2006.01)

(52) U.S. Cl.
CPC ............ *G05D 1/02* (2013.01); *G05B 19/41895* (2013.01); *G05D 1/0088* (2013.01); *G05D 1/021* (2013.01); *Y02P 90/285* (2015.11)

(58) Field of Classification Search
CPC .......... G05B 19/41895; G05D 1/0088; G05D 1/021; Y02P 90/285
USPC ................................................ 701/23, 26, 50
See application file for complete search history.

(56) References Cited

U.S. PATENT DOCUMENTS 6,457,964 B1    10/2002  Yamaguchi et al.
6,876,920 B1 *   4/2005  Mailer .................. A01B 69/00
                                                 342/457

(Continued)

FOREIGN PATENT DOCUMENTS

JP    2000-099151 A    4/2000
WO    2012/111193 A1   8/2012

OTHER PUBLICATIONS

English translation of Official Communication issued in corresponding International Application PCT/JP2013/083455, mailed on Aug. 27, 2015.

(Continued)

*Primary Examiner* — Thomas Tarcza
*Assistant Examiner* — Tyler J Lee
(74) *Attorney, Agent, or Firm* — Keating & Bennett, LLP

(57) ABSTRACT

A traveling controller of a delivery vehicle includes a command generator and an acceptable value calculator. The acceptable value calculator calculates a command acceptable value based on a current position of the delivery vehicle. An acceptable value determiner of the command generator determines whether a command position generated by a command position generator exceeds the command acceptable value. When the command position is determined to exceed the command acceptable value, a command position changer of the command generator changes the command position to the command acceptable value.

11 Claims, 12 Drawing Sheets

(56) References Cited

U.S. PATENT DOCUMENTS

| | | | | |
|---|---|---|---|---|
| 7,574,290 B2* | 8/2009 | Gibson | ................ | A01B 69/008 177/2 |
| 2014/0277897 A1* | 9/2014 | Saiz | ..................... | B60W 10/06 701/23 |

OTHER PUBLICATIONS

Official Communication issued in International Patent Application No. PCT/JP2013/083455, mailed on Mar. 4, 2014.

* cited by examiner

FIG. 4A    COMMAND INFORMATION (CYCLE: 100 ms)

| NAME | | | REMARKS |
|---|---|---|---|
| VEHICLE NO. | | | 2 |
| POWER LIMIT VALUE (POWER AMOUNT INFORMATION) | | | 1 3 0 0 W |
| OPERATION COMMAND | | | MOVEMENT/LOADING··· |
| INTER-VEHICLE DISTANCE CONTROL COMMAND | SYSTEM CLOCK | | ms |
| | POSITION | BLOCK | STARTING POINT NO. |
| | | UNIT | DISTANCE FROM STARTING POINT |
| | SPEED | | mm/s |
| | ATTRIBUTE | | |

Fig. 4B    STATUS REPORT INFORMATION (CYCLE: 100 ms)

| NAME | | REMARKS |
|---|---|---|
| VEHICLE NO. | | 1 ~ 1 5 0 0 |
| STATUS (OPERATION INFORMATION) | | MOVEMENT/LOADING··· |
| CURRENT POSITION | BLOCK | STARTING POINT NO. |
| | UNIT | DISTANCE FROM STARTING POINT |
| INTER-VEHICLE DISTANCE INFORMATION | POINT NO. ON ROUTE | |
| | DISTANCE TO POINT | |
| | TIME REQUIRED TO REACH POINT | |

Fig. 5A  MODE

| | MODE | DESCRIPTION |
|---|---|---|
| 1 | MANUAL | MODE IN WHICH OPERATOR CAUSES DELIVERY VEHICLE TO JOG BY USING REMOTE CONTROL |
| 2 | AUTOMATIC | MODE IN WHICH DELIVERY VEHICLE AUTOMATICALLY MOVES BASED ON COMMAND FROM CONTROLLER ON GROUND |
| 3 | SEMI-AUTOMATIC | MODE IN WHICH OPERATOR AUTOMATICALLY MOVES DELIVERY VEHICLE USING VEHICLE CONTROLLER ON GROUND OR REMOTE CONTROL |

Fig. 5B  STATUS (OPERATION INFORMATION)

| | STATUS | MODE | DESCRIPTION |
|---|---|---|---|
| 1 | ABNORMAL / WARNING | MANUAL /AUTOMATIC /SEMI-AUTOMATIC | RECOVERY FROM ABNORMALITY REQUIRES OPERATOR INTERVENTION. WARNING IS AUTOMATICALLY LIFTED. |
| 2 | UNSTARTED | AUTOMATIC /SEMI-AUTOMATIC | VEHICLE IS AT REST AND DOES NOT OPERATE EVEN WHEN RECEIVING COMMAND FROM CONTROLLER ON GROUND |
| 3 | IDLE | AUTOMATIC /SEMI-AUTOMATIC | VEHICLE IS AT REST BUT CAN OPERATE UPON RECEIPT OF COMMAND FROM CONTROLLER ON GROUND |
| 4 | TRAVELING FOR LOADING | AUTOMATIC /SEMI-AUTOMATIC | VEHICLE IS TRAVELING TO POSITION IN WHICH IT LOADS GOODS |
| 5 | TRAVELING FOR UNLOADING | AUTOMATIC /SEMI-AUTOMATIC | VEHICLE IS TRAVELING TO POSITION IN WHICH IT UNLOADS GOODS |
| 6 | TRAVELING | AUTOMATIC /SEMI-AUTOMATIC | VEHICLE IS TRAVELING FOR PURPOSE OTHER THAN GOODS TRANSFER, SUCH AS DISPATCH, PUSH-OUT, OR CIRCULATION |
| 7 | LOADING | AUTOMATIC /SEMI-AUTOMATIC | VEHICLE IS LOADING GOODS USING TRANSFER APPARATUS |
| 8 | UNLOADING | AUTOMATIC /SEMI-AUTOMATIC | VEHICLE IS UNLOADING GOODS USING TRANSFER APPARATUS |

DELIVERY VEHICLE AND METHOD AND PROGRAM FOR CONTROLLING DRIVE OF DELIVERY VEHICLE

BACKGROUND OF THE INVENTION

1. Field of the Invention

The present invention relates to a delivery vehicle that is moved by driving a servomotor, and a method and program to control driving of a delivery vehicle.

2. Description of the Related Art

There have been known vehicle control systems that automatically deliver goods using delivery vehicles, for example, in a factory or warehouse. In such a system, each delivery vehicle is driven by a servomechanism including a servomotor. The servomechanism includes a controller, a servo amplifier, and a servomotor. The servo amplifier drives the servomotor by supplying, to the servomotor, a drive current corresponding to the difference between the command position from the controller and the current position from a position detector in the servomotor. Japanese Unexamined Patent Application Publication No. 2000-99151 discloses, as such a system, a configuration in which the gain for feedback control varies with the weight of a loaded article.

When unexpected disturbance or the like occurs, the servomechanism may abruptly change the drive of the servomotor so that the current position follows the command position. However, such a transient movement for following the command position cannot be controlled by the controller. For this reason, the current position may significantly deviate from the command position due to the unexpected disturbance or the like, failing to follow the command position. Further, the servomechanism may raise the output torque in order to follow the command position, thereby increasing power consumption. Furthermore, such an excessive movement may impair safety. While the system of Japanese Unexamined Patent Application Publication No. 2000-99151 described above performs feedback control using an appropriate gain corresponding to the weight of a loaded article, the system does not have any means for avoiding the current position from excessively deviating from the command position.

SUMMARY OF THE INVENTION

Preferred embodiments of the present invention provide a delivery vehicle that prevents a current position from deviating from a command position due to unexpected disturbance or the like, and a method and program to control driving of a delivery vehicle.

According to a preferred embodiment of the present invention, a delivery vehicle includes a command position generator that generates a command position to move the delivery vehicle to a target position by driving a servomotor, an acceptable value calculator that calculates a predetermined acceptable value based on a current position, an acceptable value determiner that determines whether the command position exceeds the predetermined acceptable value calculated by the acceptable value calculator, and a command position changer that changes the command position when the acceptable value determiner determines that the command position exceeds the predetermined acceptable value.

The delivery vehicle may further include a position detector configured to detect the current position, and the acceptable value calculator may calculate the predetermined acceptable value based on the current position outputted from the position detector. Further, the command position changer may change the command position to the predetermined acceptable value or a predetermined position within a range which does not exceed the predetermined acceptable value. Further, the command position generator may generate the command position in predetermined cycles, and the acceptable value calculator may acquire the current position in synchronization with generation of the command position. Further, preferably, the predetermined acceptable value is set to include the amount of movement during one of the predetermined cycles. Further, the command position changer may change the command position at the timing when the command position generator generates the command position.

Another preferred embodiment of the present invention provides a method to control driving of a delivery vehicle. The method includes generating a command position to move the delivery vehicle to a target position by driving a servomotor, calculating a predetermined acceptable value based on a current position; determining whether the command position exceeds the predetermined acceptable value, and changing the command position when it is determined that the command position exceeds the predetermined acceptable value.

A further preferred embodiment of the present invention provides a non-transitory computer-readable medium including a computer program that controls driving of a delivery vehicle. The program causes the delivery vehicle to perform a command position generation process of generating a command position to move the delivery vehicle to a target position by driving a servomotor, an acceptable value calculation process of calculating a predetermined acceptable value based on a current position, an acceptable value determination process of determining whether the command position exceeds the predetermined acceptable value calculated in the acceptable value calculation process, and a command position change process of changing the command position when it is determined in the acceptable value determination process that the command position exceeds the predetermined acceptable value.

According to various preferred embodiments of the present invention, a predetermined acceptable value is calculated based on the current position; it is determined whether the command position exceeds the predetermined acceptable value; when it is determined that the command position exceeds the predetermined acceptable value, the command position is changed. Thus, it is possible to prevent the current position from deviating from the command position due to unexpected disturbance or the like. As a result, the following are prevented: a significant deviation of the current position from the command position and thus a failure to follow the command position; raising of the output torque to follow the command position and thus an increase in power consumption; and impairment of safety due to an excessive movement.

Further, if the delivery vehicle includes a position detector configured to detect the current position and the acceptable value calculator calculates the predetermined acceptable value based on the current position outputted from the position detector, it is possible to calculate an acceptable value based on the correct current position. Further, if the command position changer changes the command position to the predetermined acceptable value or to a predetermined position within a range which does not exceed the predetermined acceptable value, it is possible to set the command position to an acceptable value corresponding to the configuration or use configuration of the servomechanism, or the like. Further, if the command position generator generates the command position in predetermined cycles and the acceptable value calculator acquires the current position in synchronization with the generation of the command position, it is possible to calculate an acceptable value based on a position close to the actual current position. Further, if the predetermined acceptable value is set to include the amount of movement during one of the predetermined cycles, it is possible to set an accurate acceptable value. Further, if the command position changer changes the command position at the timing when the command position generator generates the command position, it is possible to prevent a delay in changing the command position and to control the drive of the servomotor based on the changed command position.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4A and 4B are diagrams showing command information or status report information exchanged between the vehicle controller and delivery vehicles, in which FIG. 4A is a diagram showing command information; and FIG. 4B is a diagram showing status report information.

FIGS. 5A and 5B includes diagrams showing the modes or statuses of a delivery vehicle.

DETAILED DESCRIPTION OF THE PREFERRED EMBODIMENTS

Hereafter, preferred embodiments of the present invention will be described with reference to the drawings.

Figure 1:
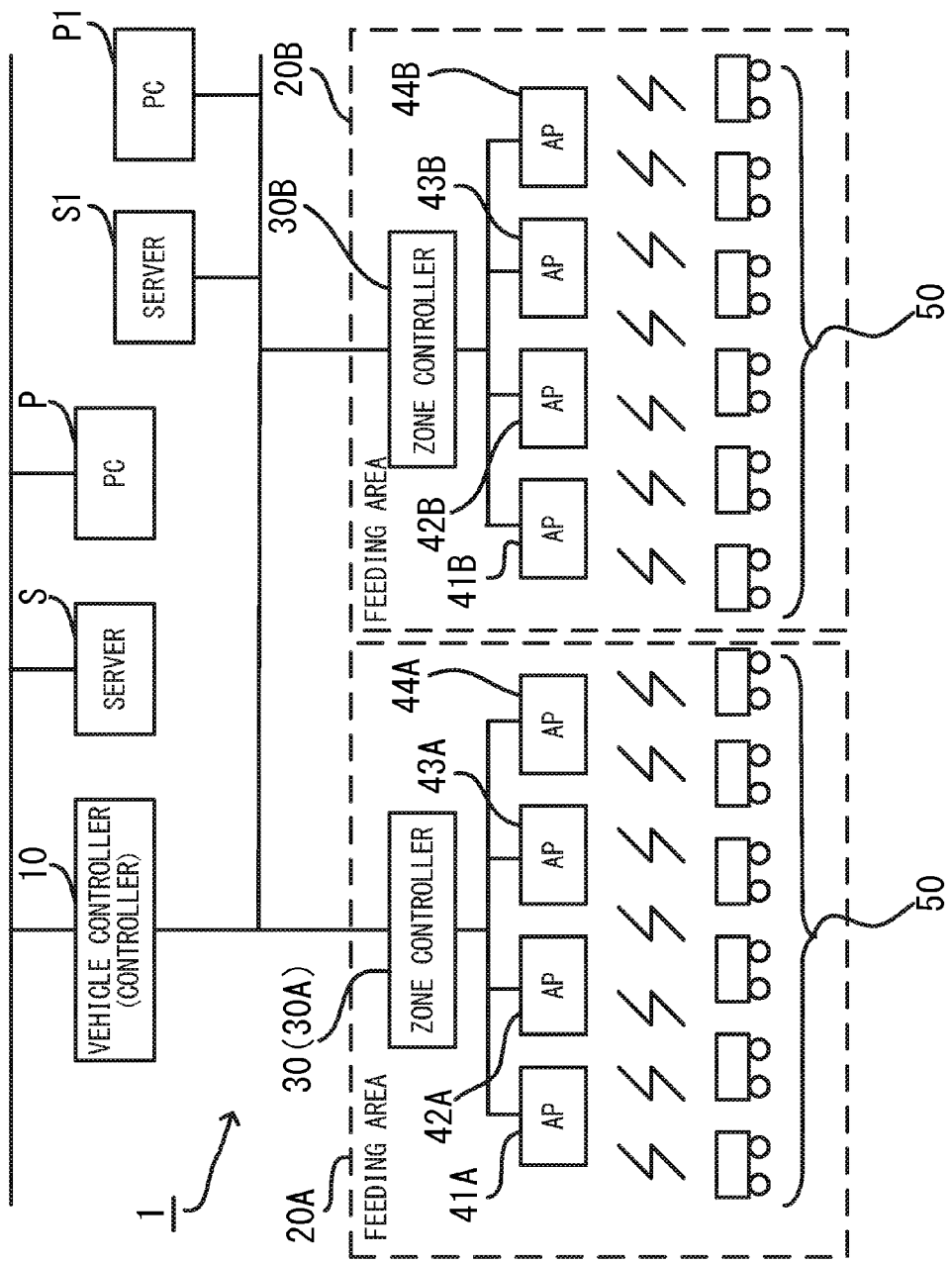
FIG. 1 is a system configuration diagram of a delivery vehicle control system according to an example preferred embodiment of the present invention.

FIG. 1 is a system configuration diagram a vehicle control system according to an example preferred embodiment of the present invention. As shown in FIG. 1, a vehicle control system 1 is a system in which multiple delivery vehicles 50 perform predetermined operations based on operation commands transmitted from a vehicle controller (controller) 10. The vehicle control system 1 includes at least multiple zone controllers 30 installed on the ground and the multiple delivery vehicles 50. If the area in which the delivery vehicles 50 are able to move is divided into multiple areas, the divided areas are provided with zone controllers 30A and 30B, respectively, in the vehicle control system 1.

In the example shown in FIG. 1, the vehicle controller 10 is connected to another server S and a personal computer P through a local area network (LAN). The vehicle controller 10 is also connected to the two zone controllers, 30A and 30B, through the LAN, as well as to a server S1 and a personal computer P1 through the LAN. The zone controller 30A is connected to multiple access points 41A to 44A (represented by "AP" in FIG. 1) through the LAN, and the zone controller 30B is connected to multiple access points 41B to 44B (represented by "AP" in FIG. 1) through the LAN. The access points 41A to 44A and 41B to 44B communicate with the multiple delivery vehicles 50 through a wireless LAN, for example.

The vehicle controller 10 is a computer server that centrally controls the vehicle control system 1. Specifically, when the vehicle controller 10 receives a request to deliver a predetermined article from the other server S, personal computer P, or the like, the vehicle controller 10 transmits, to one of the delivery vehicles 50, delivery instruction information corresponding to the delivery request and instructing the delivery vehicle 50 to deliver the predetermined article. For example, the delivery instruction includes information on which delivery vehicle 50 being used to deliver the predetermined article, the position in which the predetermined article is to be loaded, the position in which the predetermined article is to be unloaded, and the route of the delivery vehicle 50 (movement path). At this time, the vehicle controller 10 properly determines a route that bypasses the concentration or congestion of the delivery vehicles 50 while avoiding the delivery vehicle 50 from being interfered with the other delivery vehicles 50.

As shown in FIG. 1, the area in which the delivery vehicles 50 are able to move is divided into multiple areas. The multiple areas are feeding areas 20A and 20B, and are provided with the zone controllers 30A and 30B, respectively. The feeding areas 20A and 20B are each assigned the amount of power corresponding to the size of the area, the workloads of the delivery vehicles 50 in the area, and the like. The amount of power assigned to each of the feeding areas 20A and 20B serves as the main amount of power of the feeding area. The respective main amounts of power are determined by the vehicle controller 10. For example, the vehicle controller 10 assigns the main amount of power of 3500 W to the feeding area 20A and the main amount of power of 4000 W to the feeding area 20B.

In causing a delivery vehicle 50 in one feeding area (e.g., feeding area 20B) to enter other feeding area (e.g., feeding area 20A), the vehicle controller 10 transmits area entry information to the zone controller 30 in the feeding area which the delivery vehicle 50 is to enter. The area entry information includes information identifying the delivery vehicle 50 which is to enter the feeding area 20A (e.g., vehicle number information) and information indicating the operating status (status) of the delivery vehicle 50.

The zone controllers 30A and 30B perform collision prevention control (blocking control) of the delivery vehicles 50 in the feeding area 20A and 20B, respectively. As shown in FIG. 1, the zone controller 30A is installed on the ground in the feeding area 20A. The zone controller 30A performs blocking control of the delivery vehicles 50 in the feeding area 20A by wirelessly communicating with the delivery vehicles 50 in the feeding area 20A through the access points 41A to 44A. The zone controller 30B is installed on the ground in the feeding area 20B. The zone controller 30B performs blocking control of the delivery vehicles 50 in the feeding area 20B by wirelessly communicating with the delivery vehicles 50 in the feeding area 20B through the access points 41B to 44B. Note that there may be used a configuration in which the zone controllers 30A and 30B are omitted and the vehicle controller 10 performs blocking control.

The delivery vehicles 50 are, for example, ceiling traveling vehicles, which travel along rails installed on the ceiling. However, the delivery vehicles 50 are not limited to ceiling traveling vehicles and may be, for example, delivery vehicles which do not include one or both of lifting and transfer apparatuses, stacker cranes, or the like.

If the area in which the delivery vehicles 50 are able to move is not divided into multiple areas (that is, if there is only one feeding area), one zone controller 30 may perform control such as the reception of a delivery request, the determination of a task corresponding to the delivery request, and the determination of the route of the delivery vehicle 50, or there may be used a configuration in which the zone controller 30 is omitted and the vehicle controller 10 performs control of the vehicles, including blocking control. Further, even if the area in which the delivery vehicles 50 are able to move is divided into multiple feeding areas, 20A and 20B, the zone controllers 30 may perform some or all functions of the vehicle controller 10. Further, the area in which the delivery vehicles 50 are able to move may be divided into three or more feeding areas, for example. In this case, a zone controller may be installed in each feeding area.

Figure 2:
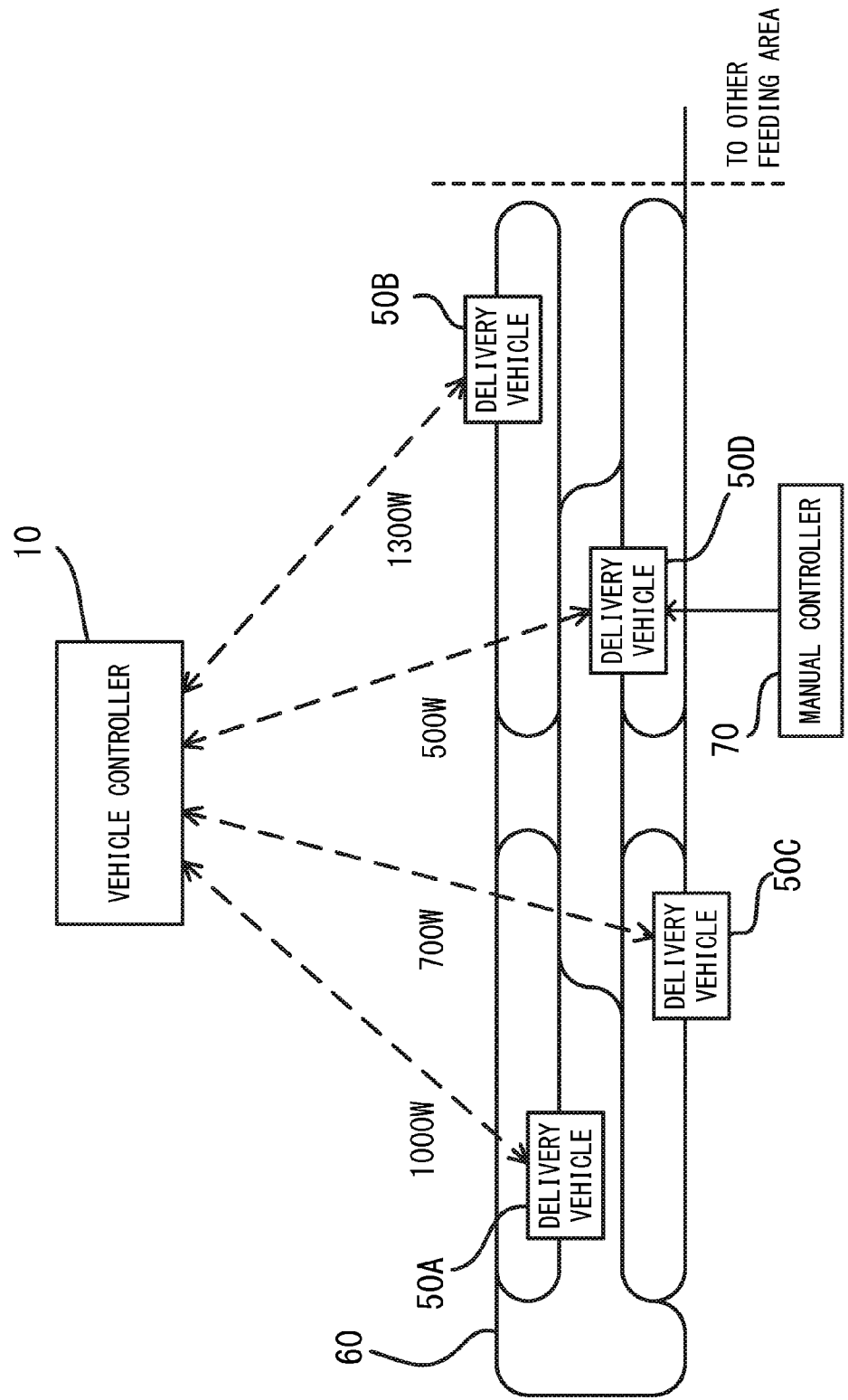
FIG. 2 is a schematic diagram showing the configuration in one feeding area, of the vehicle control system shown in FIG. 1.

FIG. 2 is a schematic diagram showing the configuration in one feeding area, of the vehicle control system shown in FIG. 1. Specifically, FIG. 2 shows the configuration in the feeding area 20A thereof. In FIG. 2, the zone controller 30A and access points 41A to 44A are omitted, and four delivery vehicles 50A to 50D are able to enter the feeding area 20A.

As shown in FIG. 2, a rail (track) 60 on which the delivery vehicles 50A to 50D travel is installed along the load ports of multiple production facilities or the like in the feeding area 20A. The rail 60 is connected to a rail installed in the other feeding area, 20B.

In the example shown in FIG. 2, the delivery vehicle 50A is automatically circulating (traveling); the delivery vehicle 50B is automatically traveling to an unloading position; the delivery vehicle 50C is automatically transferring (loading) an article; and the delivery vehicle 50D is jogging manually (based on an operation of a manual controller 70 such as a remote control by the operator).

In the present preferred embodiment, the vehicle controller 10 determines the maximum amounts of power consumption to be assigned to each delivery vehicles 50A to 50D corresponding to the operating statuses of the delivery vehicles 50A to 50D within the main amount of power that is supplied to the feeding area 20A. The maximum amounts of power consumption are the amounts of power available (consumable) to the delivery vehicles 50A to 50D, respectively, in the main amount of power assigned to the feeding area 20A.

In the example shown in FIG. 2, the delivery vehicle 50A, which is automatically circulating, is assigned the amount of power of 1000 W as the maximum amount of power consumption; the delivery vehicle 50B, which is automatically traveling to the unloading position, is assigned the amount of power of 1300 W as the maximum amount of power consumption; the delivery vehicle 50C, which is automatically transferring the article, is assigned the amount of power of 700 W as the maximum amount of power consumption; and the delivery vehicle 50D, which is manually jogging, is assigned the amount of power of 500 W as the maximum amount of power consumption. The delivery vehicles 50A to 50D perform operations such as traveling within the assigned maximum amounts of power consumption, respectively.

Although the configuration in the feeding area 20B is not shown in FIG. 2, it is the same as that in the feeding area 20A except for the number of delivery vehicles, the position of the rail, and the like. For this reason, repeated description is omitted.

Figure 3:
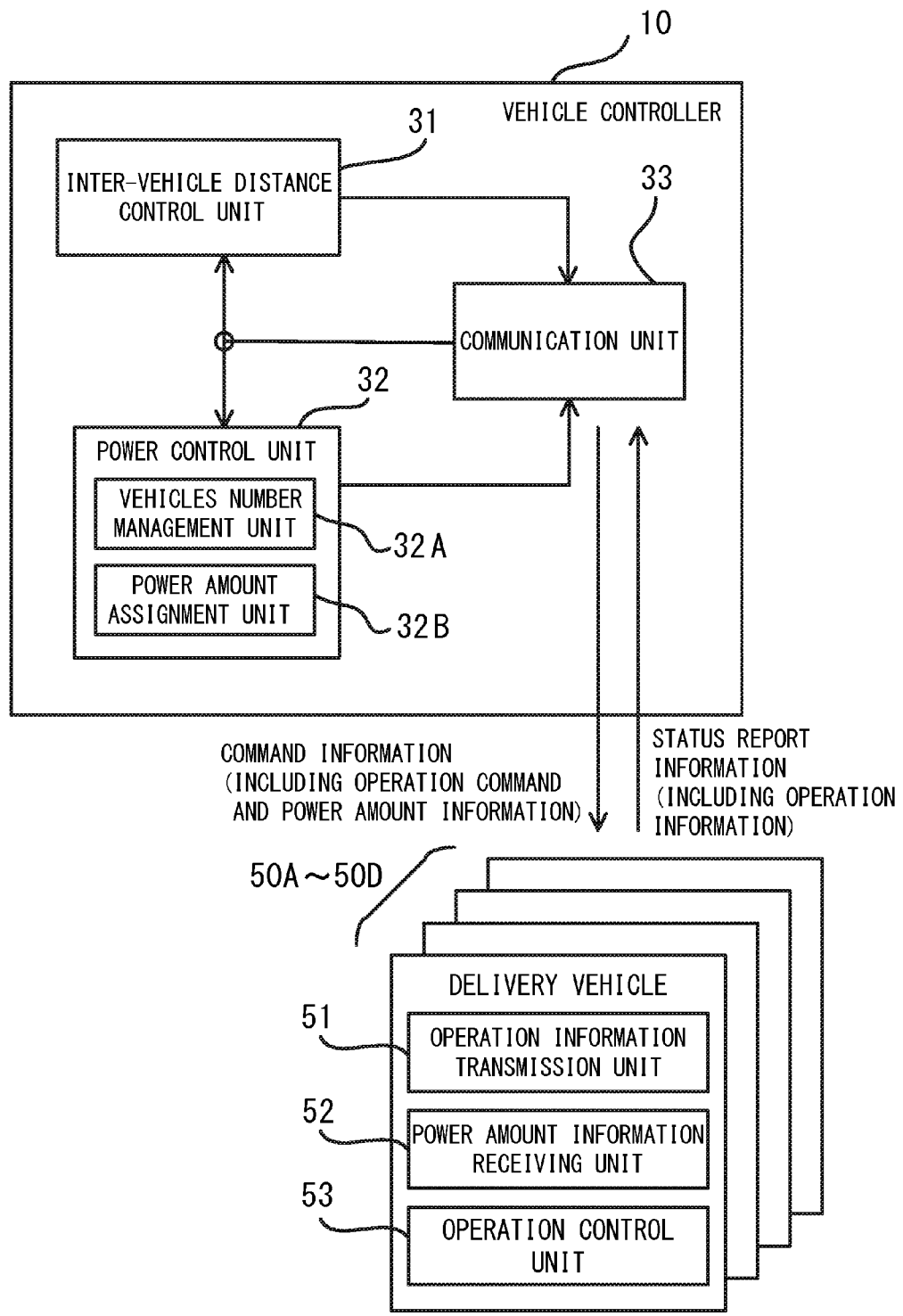
FIG. 3 is a block diagram showing the configuration of a vehicle controller shown in FIG. 1.

FIG. 3 is a block diagram showing the configuration of the vehicle controller shown in FIG. 1. FIGS. 4A and 4B are diagrams showing command information or status report information exchanged between the vehicle controller and the delivery vehicles, in which FIG. 4A is a diagram showing command information; and FIG. 4B is a diagram showing status report information. The elements shown in FIG. 3 are implemented when an arithmetic device such as a central processor (CPU) performs processing in accordance with a program stored in the memory.

As shown in FIG. 3, the vehicle controller 10 includes an inter-vehicle distance controller 31, a power controller 32, and a communicator 33. The inter-vehicle distance controller 31 is a processor that commands the operations of the delivery vehicles 50A to 50D in the feeding area 20A and/or inter-vehicle distances of the delivery vehicles 50A to 50B. Specifically, the inter-vehicle distance controller 31 recognizes the operations of the delivery vehicles 50A to 50D in the feeding area 20A and the routes of the delivery vehicles 50A to 50D based on delivery command information. The inter-vehicle distance controller 31 also recognizes the current positions of the delivery vehicles 50A to 50D on the routes in the feeding area 20A and the current distances between these delivery vehicles based on status report information transmitted from these delivery vehicles 50A to 50D as seen in FIG. 4B. The inter-vehicle distance controller 31 then outputs, to the communicator 33, command information commanding the delivery vehicles 50A to 50D in the feeding area 20A to perform operations or keep inter-vehicle distances as seen in FIG. 4A.

The command information outputted from the inter-vehicle distance controller 31 preferably includes vehicle number information identifying a delivery vehicle ("vehicle No." in FIG. 4A), operation command information commanding the delivery vehicle to perform an operation (e.g., traveling, loading, or the like) ("operation command" in FIG. 4A), and inter-vehicle distance control command information commanding the delivery vehicle to control inter-vehicle distances ("inter-vehicle distance control command" in FIG. 4A). The inter-vehicle distance control command information includes "system clock (millisecond)," "block (starting point No.)" identifying the target position, "unit (distance from starting point)," "speed (mm/s)," and "attribute."

The information, for which the inter-vehicle distance controller 31 recognize the current positions of the delivery vehicles 50A to 50D and the current inter-vehicle distances, are vehicle number information identifying a vehicle (e.g., "1 to 1500"), current position information ("current position" in FIG. 4B) including "block (starting point No.)" identifying the current position of the delivery vehicle and "unit (distance from starting point)," and inter-vehicle distance information consisting of "point No. on route" "distance to point" and "time required to reach point" among the status report information shown in FIG. 4B.

The power controller 32 is a processor that manages the number of the delivery vehicles 50 in the feeding area 20A and determines the maximum amounts of power consumption assigned to the respective delivery vehicles 50 in the feeding area 20A. As shown in FIG. 3, the power controller 32 includes a vehicles number controller 32A and a power amount assigner 32B. The vehicles number controller 32A determines whether to permit delivery vehicles 50 to enter the feeding area 20A and also determines the number of delivery vehicles 50 that perform operations such as traveling in the feeding area 20A. The power amount assigner 32B determines the maximum amounts of power consumption corresponding to the number of delivery vehicles 50 in the feeding area 20A determined by the vehicles number controller 32A and the current operating statuses (statuses) of delivery vehicles 50, and assigns the determined maximum amounts of power consumption to the respective delivery vehicles 50.

Specifically, the power controller 32 recognizes the main amount of power that is able to be supplied to the feeding area 20A, based on feeding area information and suppliable power information. The power controller 32 also recognizes the current statuses (statuses) of the delivery vehicles 50A to 50D in the feeding area 20A based on the status report information, shown in FIG. 4B, transmitted from the delivery vehicles 50A to 50D. The power controller 32 also recognizes whether there are any delivery vehicles which are newly entering the feeding area 20A, based on the area entry information.

More specifically, the information, for which the power controller 32 recognizes the operating status of each of the delivery vehicles 50A to 50D, are vehicle number information identifying the delivery vehicle (e.g., "1 to 1500") and status information ("operation information") indicating the operating status of the delivery vehicle among the status report information shown in FIG. 4B.

The vehicles number controller 32A of the power controller 32 determines the number of the delivery vehicles in the feeding area 20A based on the main amount of power, the statuses of the delivery vehicles 50 (if there are any newly entering delivery vehicles, the statuses of those delivery vehicles), the number of the delivery vehicles 50 in the feeding area 20A, and information indicating whether there are any delivery vehicles entering the feeding area 20A. The power amount assigner 32B of the power controller 32 determines the maximum amounts of power consumption assigned to the respective delivery vehicles 50 within the main amount of power based on the number of delivery vehicles 50 in the feeding area 20A determined by the vehicles number controller 32A and the current operating statuses (statuses) of the delivery vehicles 50. The power amount assigner 32B of the power controller 32 then outputs power amount information indicating each determined maximum amount of power consumption to the communicator 33.

The power amount information indicating the maximum amount of power consumption outputted from the power controller 32 is "power limit value" in the command information shown in FIG. 4A.

The communicator 33 is a processor that transmits or receives information to or from the delivery vehicles 50A to 50D in communication cycles of, for example, 100 ms. Specifically, the communicator 33 sets, in a transmission buffer, command information outputted from the inter-vehicle distance controller 31 and commanding each delivery vehicle to perform an operation or keep inter-vehicle distances, that is, the vehicle number information, operation command information, and inter-vehicle distance control information in the command information shown in FIG. 4A. The communicator 33 also sets, in the transmission buffer, the power amount information outputted from the power controller 32 ("power limit value" in the command information shown in FIG. 4A). The communicator 33 then transmits the buffered command information to the delivery vehicles 50A to 50D in synchronization with in communication cycles of 100 ms.

As shown in FIG. 3, the delivery vehicles 50A to 50D each include an operation information transmitter 51 that transmits operation information to the vehicle controller 10, a power amount information receiver 52 that receives power amount information transmitted from the vehicle controller 10, and an operation controller 53 that performs an operation within the amount of power assigned by the power amount assigner 32B.

Next, specific examples of the status (operating status) will be described. FIGS. 5A and 5B are diagrams showing the modes and statuses of a delivery vehicle. In the present preferred embodiment, as shown in FIG. 5A, a delivery vehicle 50 has three modes: "manual," "automatic," and "semi-automatic." "Manual" is a mode in which the operator causes the delivery vehicle 50 to jog by using a remote control (manual controller 70) near the delivery vehicle 50. "Automatic" is a mode in which the delivery vehicle 50 automatically moves based on a command from the vehicle controller 10. "Semi-automatic" is a mode in which the operator automatically moves the delivery vehicle 50 using the vehicle controller 10 or remote control.

Further, in the present preferred embodiment, as shown in FIG. 5B, the delivery vehicle 50 preferably has eight statuses, for example: "abnormal/warning," "unstarted," "idle," "traveling for loading," "traveling for unloading," "traveling," "loading," and "unloading." "Abnormal/warning" is a status in which an abnormality is occurring and a warning is needed. "Unstarted" is a status in which the delivery vehicle 50 is yet to be started. "Idle" is a status in which the delivery vehicle 50 is at rest but can perform an operation upon receipt of a command from the vehicle controller 10. "Traveling for loading" is a status in which the delivery vehicle 50 is traveling to the position in which it loads goods (articles). "Traveling for unloading" is a status in which the delivery vehicle 50 is traveling to the position in which it unloads goods. "Traveling" is a status in which the delivery vehicle 50 is traveling for a purpose other than the transfer of goods, such as dispatch, push-out, or circulation. "Loading" is a status in which the delivery vehicle 50 is raising the lifting apparatus thereof after lowering it and causing a gripper to grasp goods, for example, on the load port of a production facility below the rail. "Unloading" is a status in which the delivery vehicle 50 is raising the lifting apparatus after lowering it and placing goods grasped by the gripper, for example, on the load port of a production facility below the rail.

The status "abnormal/warning" has manual, automatic, and semi-automatic modes. The statuses other than "abnormal/warning" have automatic and semi-automatic modes. For example, the status "traveling" includes "traveling automatically," whose mode is automatic, and "traveling semi-automatically," whose mode is semi-automatic. Similarly, the status "loading" includes "loading automatically," whose mode is automatic and "loading semi-automatically," whose mode is semi-automatic. The same applies to the other statuses.

While the delivery vehicle 50 preferably has the multiple statuses (operating statuses) as described above, the required amount of power varies among the statuses. For this reason, in the present preferred embodiment, the power controller 32 of the vehicle controller 10 assigns the delivery vehicles 50 the main amount of power which is able to be supplied to the feeding areas 20A and 20B with optimal allocation corresponding to the operating statuses of the delivery vehicles 50. The respective delivery vehicles 50 perform operations requested by commands within the assigned maximum amounts of power consumption.

Figure 6:
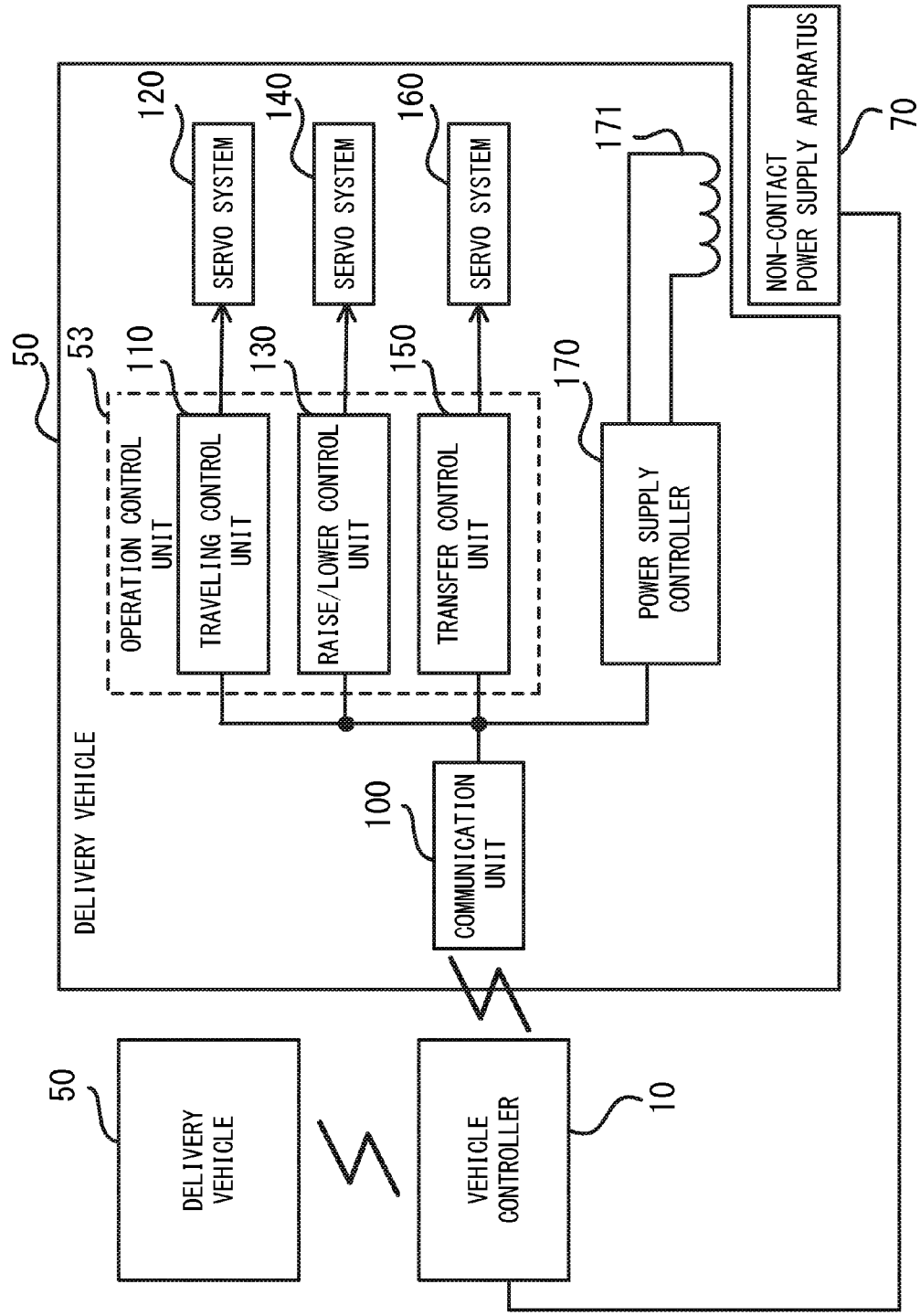
FIG. 6 is a block diagram showing the configuration of a delivery vehicle shown in FIG. 1.

FIG. 6 is a block diagram showing the configuration of a delivery vehicle shown in FIG. 1. It is assumed that the delivery vehicle 50 shown in FIG. 6 is a delivery vehicle in the feeding area 20A (e.g., one of the delivery vehicles 50A to 50D shown in FIG. 2). Further, in the present preferred embodiment, it is assumed that the delivery vehicles 50 preferably have the same configuration. As shown in FIG. 6, the delivery vehicle 50 includes a communicator 100, a traveling controller 110, a raise/lower controller 130, a transfer controller 150, servo systems 120, 140, and 160, a power supply controller 170, and a power receiving coil 171.

The traveling controller 110, raise/lower controller 130, and transfer controller 150 constitute the operation controller 53 shown in FIG. 3. The communicator 100, operation controller 53 (traveling controller 110, raise/lower controller 130, and transfer controller 150), and servo systems 120, 140, and 160 constitute a servomechanism.

The communicator 100 is a processor that receives command information from the vehicle controller 10 and transmits status report information to the vehicle controller 10. The communicator 100 transmits or receives information to or from the vehicle controller 10 in communication cycles of, for example, 100 ms. The communicator 100 serves as the operation information transmitter 51 and power amount information receiver 52 shown in FIG. 3.

The traveling controller 110 controls the traveling of the delivery vehicle 50 by transmitting a command to the servo system 120 to drive a servomotor (see FIG. 8) in the servo system 120. The traveling controller 110 also transmits status report information (status information, current position information, inter-vehicle distance information) corresponding to the current operating status of the delivery vehicle 50 through the communicator 100.

The raise/lower controller 130 controls the raising or lowering of a platform (not shown) mounted on the delivery vehicle 50 by transmitting a command to the servo system 140 to drive a servomotor (not shown) in the servo system 140. The raise/lower controller 130 also transmits status report information (mainly, status information) corresponding to the current operating status of the platform through the communicator 100.

The transfer controller 150 causes a gripper (not shown) mounted on the platform of the delivery vehicle 50 to grip or release goods by transmitting a command to the servo system 160 to drive a servomotor (not shown) in the servo system 160. The transfer controller 150 also transmits status report information (mainly, status information) corresponding to the current operating status of the transfer apparatus through the communicator 100.

The power supply controller 170 and power receiving coil 171 constitute a non-contact power receiving apparatus of the delivery vehicle 50. A guide wire (also called a feeder line) installed along the rail 60 (see FIG. 2) and a feeder panel that converts commercial power into power having a predetermined frequency suitable for non-contact power supply and transmits the power to the guide wire constitute a non-contact power supply apparatus 70 shown in FIG. 6. When the feeder panel transmits the power having the predetermined frequency to the guide wire, a magnetic field occurs around the guide wire. The power receiving coil 171 is disposed in a position opposite to the guide wire in the delivery vehicle 50 and receives the power through the magnetic field generated by the guide wire. The power supply controller 170 stabilizes the power received by the power receiving coil 171 and supplies the resulting power to the servo systems 120, 140, and 160.

While the vehicle controller 10 and delivery vehicles 50 are able to communicate with each other as described above, the delivery vehicles 50 are also able to communicate with one another.

Next, the operation of the vehicle control system 1 according to various preferred embodiments of the present invention will be described.

Figure 7:
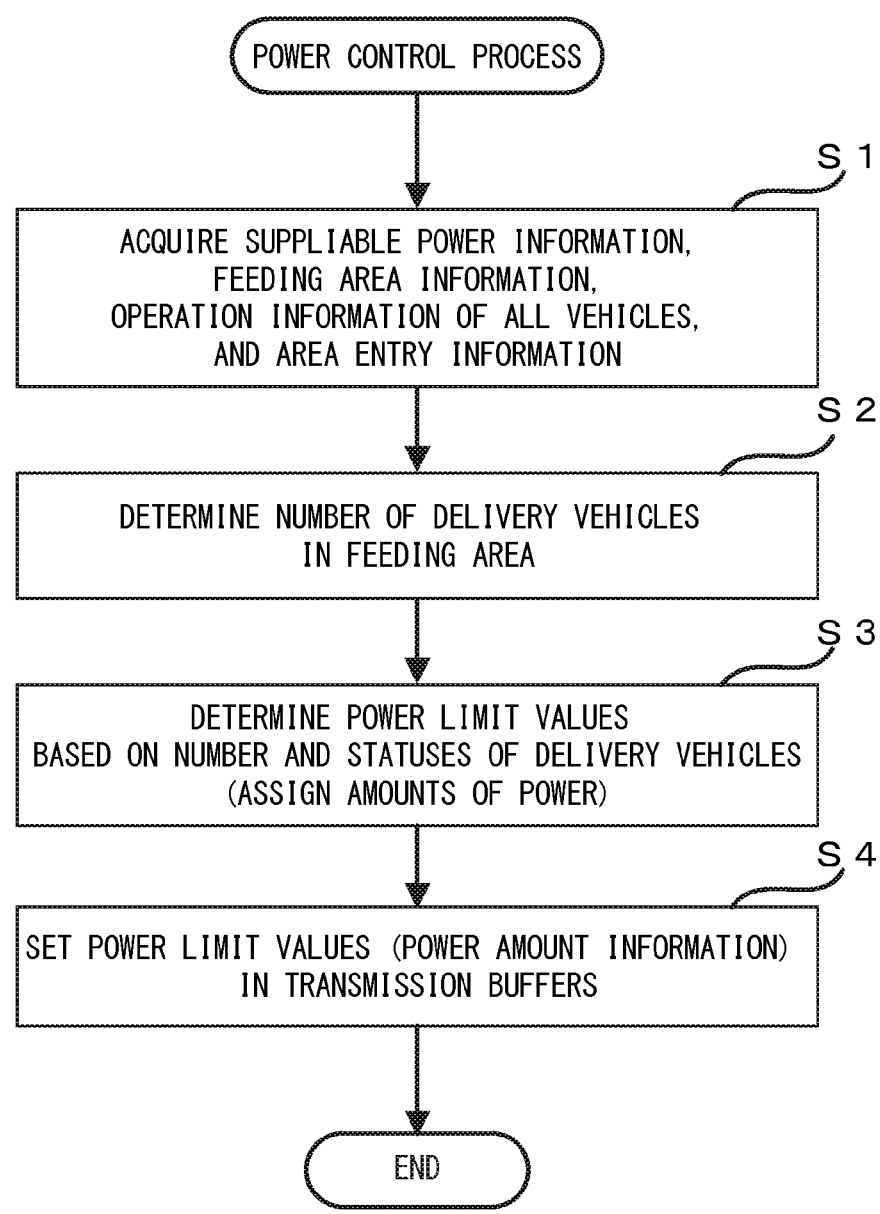
FIG. 7 is a flowchart showing an example of a power control process performed by the vehicle controller.

FIG. 7 is a flowchart showing an example of a power control process performed by the vehicle controller. In the description of FIG. 7, it is assumed that the vehicle controller 10 performs a power control process. In the power control process shown in FIG. 7, the power controller 32 of the vehicle controller 10 acquires suppliable power information and feeding area information. The power controller 32 also receives status report information transmitted from all the delivery vehicles, 50A to 50D, in the feeding area 20A through the communicator 33. The power controller 32 also acquires area entry information. In this way, the power controller 32 acquires the suppliable power information, feeding area information, status report information, and area entry information (step S1).

The power controller 32 then recognizes the main amount of power that is able to be supplied to the feeding area 20A, based on the suppliable power information and feeding area information. The power controller 32 also recognizes the statuses (operating statuses) and number of the delivery vehicles 50A to 50D based on the status report information. The power controller 32 also recognizes whether there are any delivery vehicles which are newly entering the feeding area 20A, based on the area entry information.

Next, the vehicles number controller 32A of the power controller 32 determines the number of the delivery vehicles in the feeding area 20A based on the recognized main amount of power, the statuses of the delivery vehicles 50A to 50D (if there are any newly entering delivery vehicles, the statuses of those delivery vehicles), the number of the delivery vehicles 50A to 50D, and information indicating whether there are any delivery vehicles entering the feeding area 20A (step S2).

Specifically, the vehicles number controller 32A of the power controller 32 determines the number of delivery vehicles in the feeding area 20A using the following method. That is, the vehicles number controller 32A determines whether there are any delivery vehicles which are newly entering the feeding area 20A, based on the area entry information; if the vehicles number controller 32A determines that there are no newly entering delivery vehicles, it grasps the number of the delivery vehicles 50A to 50D currently present in the feeding area 20A (four in the example shown in FIG. 2) as the number of delivery vehicles; and if the vehicles number controller 32A determines that there are any newly entering delivery vehicles, it adds the number of the delivery vehicles newly entering the feeding area 20A to the number of the delivery vehicles 50A to 50D currently present in the feeding area 20A and grasps the resulting number as the number of delivery vehicles. The vehicles number controller 32A then checks the statuses (operating statuses) of all the delivery vehicles grasped as the number of delivery vehicles. The vehicles number controller 32A also checks the minimum guarantee amounts of power corresponding to the statuses of all the delivery vehicles. As used herein, the minimum guarantee amount of power refers to the minimum amount of power which the delivery vehicle requires to perform an operation corresponding to the status thereof and which should be guaranteed.

The vehicles number controller 32A then determines whether a total minimum guarantee amount of power obtained by summing up the minimum guarantee amounts of power corresponding to the statuses of all the delivery vehicles exceeds the main amount of power that can be supplied to the feeding area 20A. If the total minimum guarantee amount of power does not exceed the main amount of power, the vehicles number controller 32A permits the new delivery vehicles to enter the feeding area 20A. In contrast, if the total minimum guarantee amount of power exceeds the main amount of power, the vehicles number controller 32A refuses (restricts) the entry of the new delivery vehicles into the feeding area 20A.

If the vehicles number controller 32A of the power controller 32 refuses the entry of those delivery vehicles into the feeding area 20A in step S2, it outputs the result. The vehicle controller 10 receives the result and places those delivery vehicles on standby or performs a process such as the change of the route.

Subsequently, based on the number and statuses of the delivery vehicles determined in step S2, the power amount assigner 32B of the power controller 32 determines the power limit values (maximum amounts of power consumption) of the delivery vehicles (step S3). Specifically, the power amount assigner 32B determines standard amounts of power corresponding to the statuses of all the delivery vehicles determined in step S2 as the power limit values of those delivery vehicles. As used herein, the standard amount of power refers to a sufficient amount of power to perform an operation corresponding to the status.

The power amount assigner 32B then determines whether a total standard amount of power obtained by summing up the standard amounts of power corresponding to the statuses of all the delivery vehicles exceeds the main amount of power that is able to be supplied to the feeding area 20A. If the total standard amount of power exceeds the main amount of power, the power amount assigner 32B sets power limit values to all the delivery vehicles in such a manner that the sum of the power limit values of all the delivery vehicles falls within the main amount of power and in such a manner that the power limit value of at least one of all the delivery vehicles does not fall below the corresponding minimum guarantee amount of power, based on predetermined priorities assigned to the statuses. Higher priorities are assigned to more important statuses in order to efficiently perform delivery tasks corresponding to delivery requests. For example, the power amount assigner 32B sets, to a delivery vehicle whose status has the highest priority, the standard amount of power thereof as the power limit value and sets, to a delivery vehicle whose status has a low priority, the amount of power which is smaller than the corresponding standard amount of power but does not fall below the corresponding minimum guarantee amount of power as the power limit value.

Subsequently, the power controller 32 outputs the power limit values of the delivery vehicles determined in step S3 to the communicator 33. The communicator 33 sets the power limit values in transmission buffers corresponding to the respective delivery vehicles (step S4). The communicator 33 then transmits command information including the power limit value information to the delivery vehicles in synchronization with the communication cycles.

In step S3 described above, if the sum of the standard amounts of power exceeds the main amount of power, the power controller 32 sets power limit values to all the delivery vehicles based on the predetermined priorities assigned to the statuses, but it is not limited such a configuration. For example, the power controller 32 may set power limit values to all the delivery vehicles so that the sum of the power limit values of all the delivery vehicles falls within the main amount of power, by uniformly reducing, from the respective standard amounts of power of all the delivery vehicles, the amount of power obtained by dividing, by the number of all the delivery vehicles, the amount of power by which the sum of the standard amounts of power exceeds the main amount of power.

The power control by the vehicle controller 10 described with reference to FIG. 7 produces the following advantageous effects. That is, the power controller 32 assigns, to the delivery vehicles 50, available amounts of power corresponding to the statuses (operating statuses) thereof within the main amount of power, and the delivery vehicles 50 perform predetermined operations within the respective assigned amounts of power. That is, the power controller 32 assigns, to the delivery vehicles 50, the amounts of power most suitable for the statuses thereof within the main amount of power available to the system. Thus, it is possible to increase the number of delivery vehicles 50 that are able to be driven and thus to improve delivery efficiency. Further, since the main amount of power that is able to be supplied to the vehicle control system 1 is used efficiently, the main amount of power is significantly reduced.

Further, since each delivery vehicle 50 transmits status information about the current operation thereof to the vehicle controller 10 in predetermined cycles, the vehicle controller 10 is able to change the amount of power assigned to the delivery vehicle 50 in accordance with the operation thereof when necessary. Thus, a robust system is provided. Further, in the case that the power controller 32 assigns the amounts of power to the delivery vehicles 50 based on the priorities of the operations of the delivery vehicles 50, the power controller 32 is able to assign a sufficient amount of power to a delivery vehicle 50 which is performing an important operation in a delivery task. As a result, a reduction in the efficiency of the delivery task is avoided. Further, in the case that the power controller 32 assigns to each delivery vehicle 50, the amount of power that does not fall below the corresponding minimum guarantee amount of power, which allows the delivery vehicle 50 to perform a predetermined operation, the power controller 32 prevents the delivery vehicles 50 from lacking power.

Further, if the area in which the delivery vehicles 50 are able to move is divided into multiple feeding areas, 20A and 20B, and if the system includes a vehicle controller 10 that assigns the suitable main amounts of power to the feeding areas 20A and 20B, it is possible to improve the power efficiency of the entire system, which is divided into the multiple areas, 20A and 20B. Further, when a delivery vehicle from one of the feeding areas 20A and 20B enters the other feeding area, if the amount of power assigned by the power controller 32, of at least one of the delivery vehicles 50 in the other feeding area falls below the corresponding guaranteed minimum amount, which allows the delivery vehicle 50 to perform a predetermined operation, the vehicle controller 10 restricts the entry of the delivery vehicle into the other feeding area. As a result of the configuration described above, it is possible to reliably drive the delivery vehicles 50 in the feeding areas managed by the vehicle controller.

Figure 8:
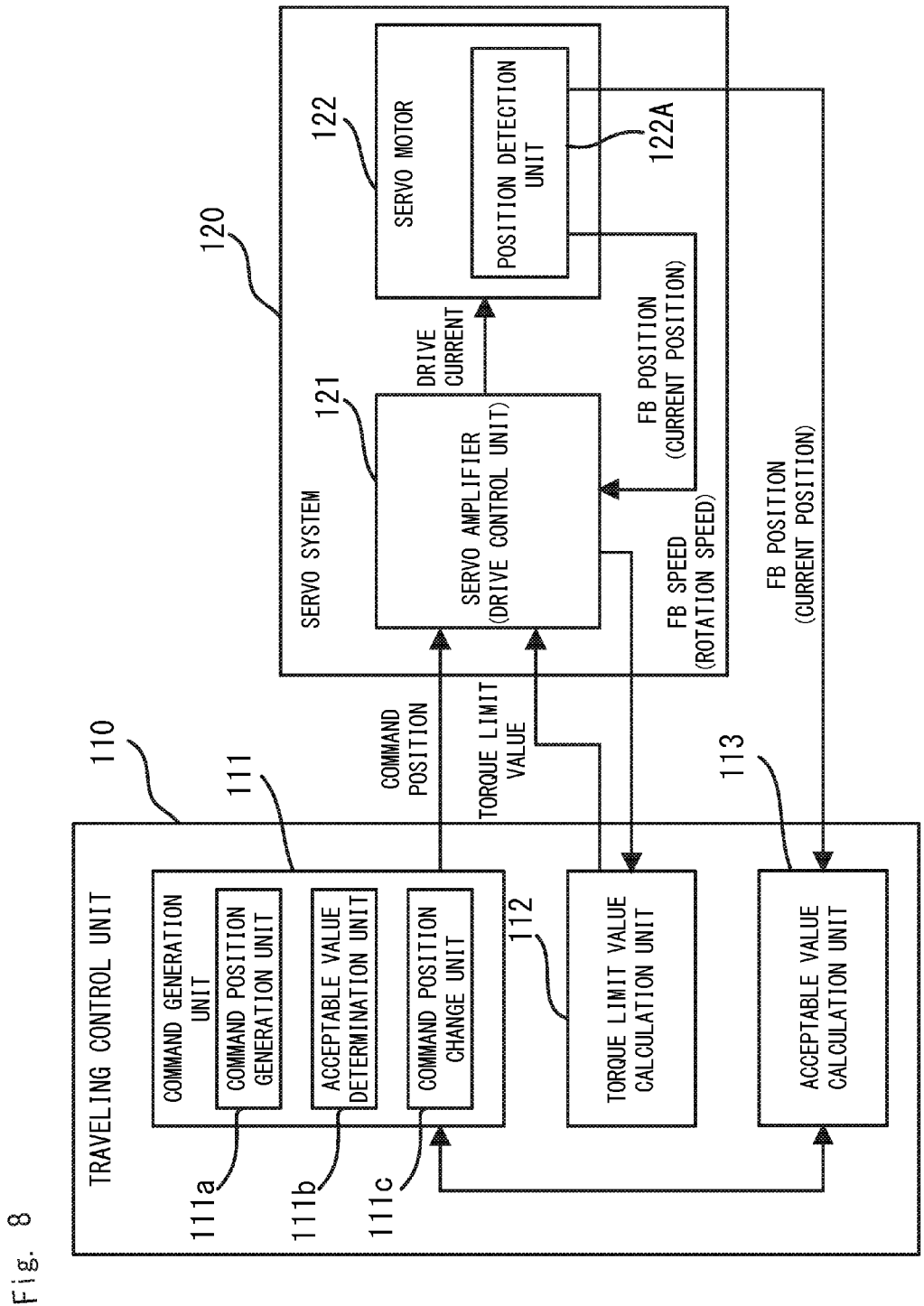
FIG. 8 is a block diagram showing the configurations of a traveling controller and a servo system.

FIG. 8 is a block diagram showing the configurations of the traveling controller and servo system. The elements shown in FIG. 8 are implemented when an arithmetic device such as a CPU performs processing in accordance with a program stored in the memory.

The traveling controller 110 includes a command generator 111, a torque limit value calculator 112, and an acceptable value calculator 113. The command generator 111 includes a command position generator 111a, an acceptable value determiner 111b, and a command position changer 111c. The command position generator 111a of the command generator 111 receives command information transmitted from the vehicle controller 10 through the communicator 100. Then, based on operation command information and inter-vehicle distance control command information included in the command information, the command position generator 111a generates an operation waveform to cause the delivery vehicle 50 to perform an operation (traveling) indicated by the operation command information at a position and speed indicated by the inter-vehicle distance control command information.

The command position generator 111a of the command generator 111 then generates a command position (the amount of rotation, rotation angle) of a servomotor 122 of the servo system 120 based on the generated operation waveform. The command position generator 111a then outputs the generated command position to a servo amplifier 121 of the servo system 120, as well as to the acceptable value calculator 113. The command position here is a pulse signal. The position (the amount of rotation, rotation angle) of the servomotor 122 with respect to one pulse is predetermined. The pulse frequency serves as the speed (the number of revolutions, rotation speed) of the servomotor 122.

The acceptable value determiner 111b of the command generator 111 determines whether to change the position commanded to the servo amplifier 121 by the command position signal (hereafter referred to as the command position), based on a command acceptable value (to be discussed later) outputted from the acceptable value calculator 113. In the present preferred embodiment, if the acceptable value determiner 111b determines that the command position generated by the command position generator 111a based on the operation waveform (the command position generated based on the command information from the vehicle controller 10) exceeds the command acceptable value, it determines that the command position is to be changed to the command acceptable value. When the acceptable value determiner 111b determines that the command position to be changed, the command position changer 111c of the command generator 111 changes the command position to the command acceptable value and outputs the changed command position to the servo amplifier 121 of the servo system 120.

The torque limit value calculator 112 receives the power limit value (power amount information) included in the command information transmitted from the vehicle controller 10. The torque limit value calculator 112 also receives the current speed of the servomotor 122 fed back from the servo amplifier 121 (hereafter referred to as the "FB speed"). The torque limit value calculator 112 then calculates a torque limit value to limit the maximum torque of the servomotor 122 based on the FB speed from the servomotor 122 and the power limit value (maximum power consumption) indicated by the power amount information and outputs the calculated torque limit value to the servo amplifier 121.

The acceptable value calculator 113 receives the current position of the servomotor 122 fed back from a position detector 122A disposed in the servomotor 122 (hereafter referred to as the "FB position"). Then, based on the FB position, the acceptable value calculator 113 calculates a command acceptable value, which is acceptable as a command position that the FB position should follow. The acceptable value calculator 113 then outputs the calculated command acceptable value to the command generator 111.

The servo system 120 includes the servo amplifier (drive controller) 121 and servomotor 122. The servo amplifier 121 calculates a deviation (difference) of the FB position (pulse signal) outputted by the position detector 122A of the servomotor 122 from the command position outputted by the command generator 111 using a deviation counter. The servo amplifier 121 then controls the drive of the servomotor 122 by supplying a drive current corresponding to the deviation calculated using the deviation counter to the servomotor 122. At this time, the servo amplifier 121 controls the drive current to drive the servomotor 122 so that the torque of the servomotor 122 does not exceed the torque limit value outputted from the torque limit value calculator 112. The servo amplifier 121 also converts the FB position outputted from the position detector 122A into a FB speed and outputs the FB speed to the torque limit value calculator 112.

The servomotor 122 is a motor that is driven (rotationally driven) based on the drive current supplied from the servo amplifier 121. The servomotor 122 includes the position detector 122A, which detects the position (the amount of rotation) of the servomotor 122. The position detector 122A consists of, for example, an encoder. However, the position detector 122A is not limited to an encoder and may be a position sensor such as a laser range finder or magnetic linear sensor. The position detector 122A outputs the FB position indicating the detected current position of the servomotor 122 to the servo amplifier 121 and the acceptable value calculator 113.

The traveling controller 110 or command generator 111 includes a processor that outputs the current operating status (status) to the communicator 100. This also applies to the raise/lower controller 130 and transfer controller 150. The operation information transmitter 51 of the communicator 100 transmits status report information including operation information to the vehicle controller 10 based on the operating statuses outputted from the traveling controller 110, raise/lower controller 130, and transfer controller 150.

The delivery vehicles 50 must perform operations such as traveling within the respective maximum amounts of power consumption (power limit values) assigned by the vehicle controller 10. Hereafter, a configuration to limit the torque of the servomotor based on the power limit value will be described.

Figure 9:
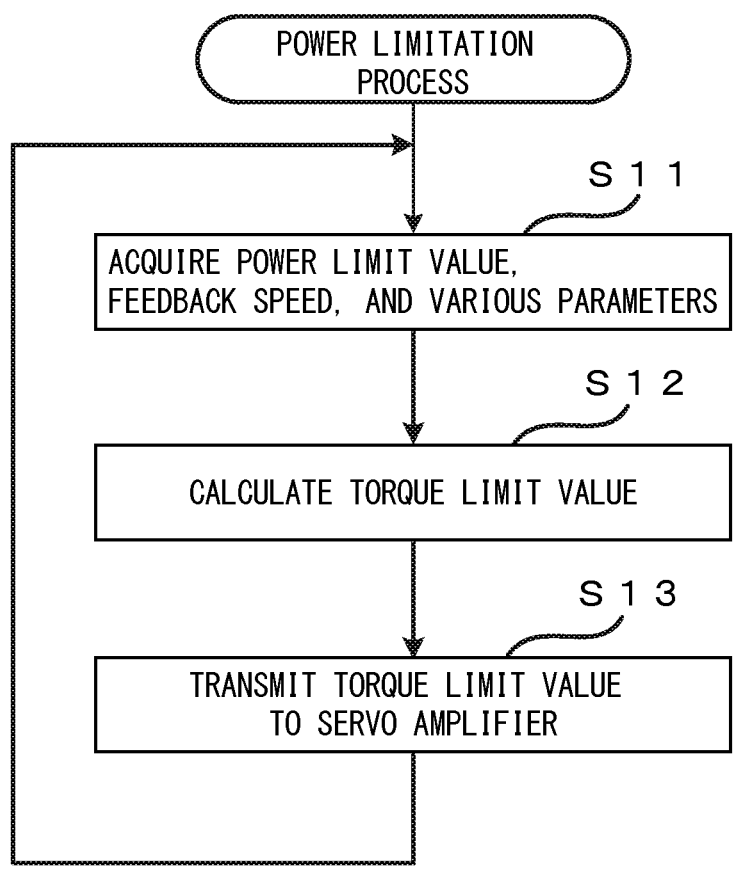
FIG. 9 is a flowchart showing an example of a power limitation process performed by the traveling controller.

FIG. 9 is a flowchart showing an example of a power limitation process performed by the traveling controller. The power limitation process shown in FIG. 9 is repeatedly performed in the same cycles as those in which the traveling controller 110 and servo amplifier 121 communicate with each other (e.g., 0.888 ms or 0.444 ms). As shown in FIG. 9, the torque limit value calculator 112 of the traveling controller 110 receives the power limit value included in the command information transmitted from the vehicle controller 10. The torque limit value calculator 112 also receives the feedback speed from the servo amplifier 121. The torque limit value calculator 112 also acquires various parameters preset to the servo system 120. The various parameters include the efficiency of the traveling driver (servo system 120 and the like) and standby power.

The torque limit value calculator 112 then calculates a torque limit value τ to limit the maximum torque of the servomotor 122, for example, based on the following formula in which the FB speed of the servomotor 122 and the power limit value (maximum power consumption) indicated by the power limit value information serve as variables (step S12).

$$\tau \leq (P-\alpha)/((1/\eta)*(2*\pi/60)*\omega)$$

In this formula, P represents the maximum power consumption (i.e., power limit value) (W); η represents the efficiency of the traveling driver; ω represents the revolutions per minute (rpm) of the servomotor 122=FB speed (0.01 rpm)/100; τ represents the motor torque (Nm) of the servomotor 122=(FB torque (0.1%)/10)*1.3 (Nm)/100; and α represents standby power (W).

The torque limit value calculator 112 then outputs (transmits) the calculated torque limit value to the servo amplifier 121 (step S13). The communication cycles between the traveling controller 110 and servo amplifier 121 are, for example, 0.888 ms (0.444 ms in some cases). Specifically, the torque limit value calculator 112 sets the torque limit value calculated in step S12 in a buffer, and transmits the torque limit value set in the buffer to the servo amplifier 121 at the timing synchronous with the communication cycles.

Figure 10:
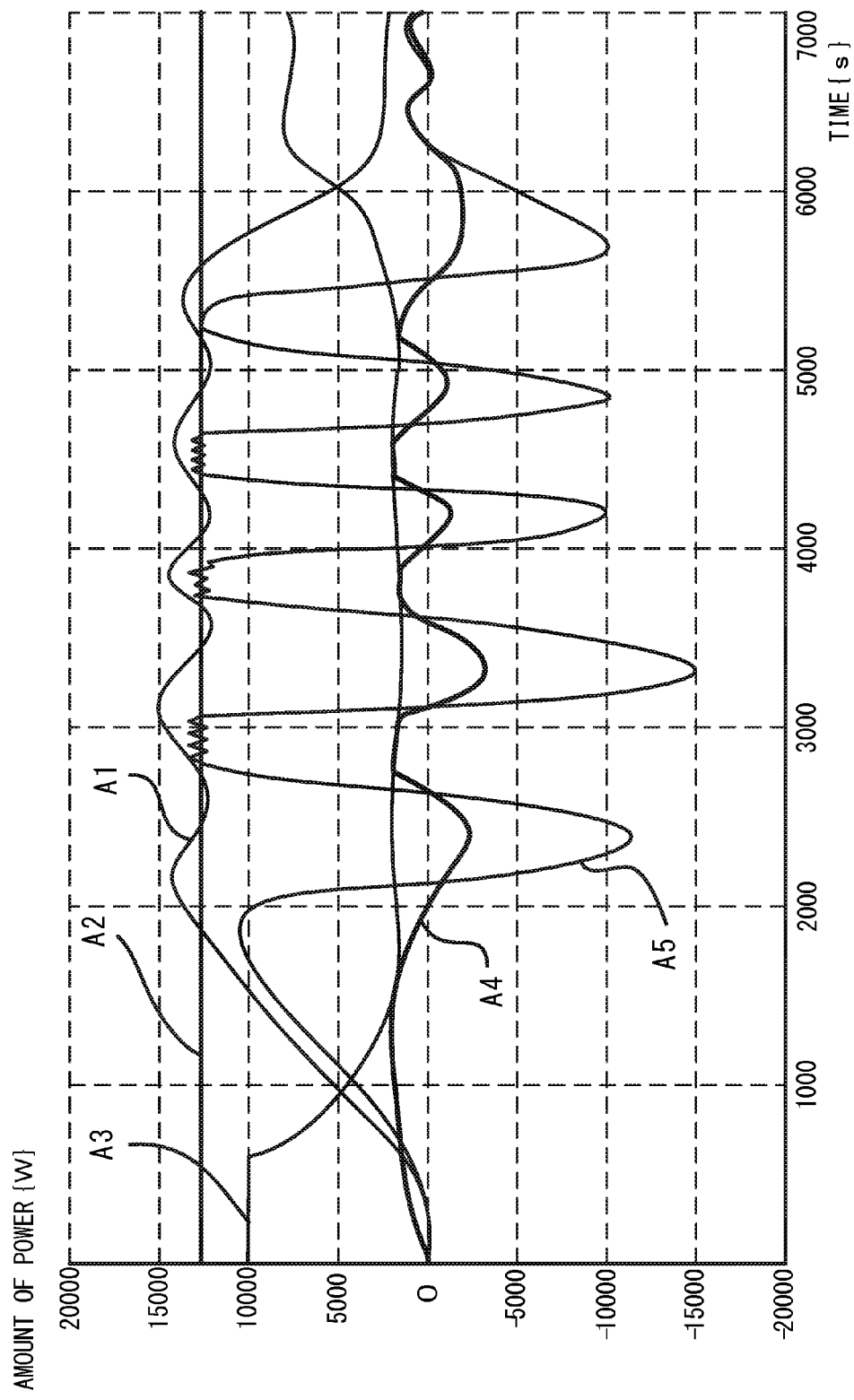
FIG. 10 is a waveform diagram showing the relationships among the power consumption, speed, torque, and torque limit value of a servomotor.

FIG. 10 is a waveform diagram showing the relationships among the power consumption, speed, torque, and torque limit value of the servomotor. In FIG. 10, the vertical axis represents the amount of power (W), and the horizontal axis represents the time (s). Also, A1 represents the FB speed (0.1 rpm), A2 represents the maximum amount of power consumption (power limit value) (0.1 W), A3 represents the torque limit value (0.1%), A4 represents the feedback torque (the current torque of the servomotor 122; "FB torque" in FIG. 10) (0.1%), and A5 represents the amount of power consumption (0.1 W) of the servomotor 122. As shown in FIG. 10, the maximum amount of power consumption (power limit value) (0.1 W) is set to 1300 W.

The torque limit value calculator 112 calculates a torque limit value A3 based on the FB speed A1 and the maximum amount of power consumption A2. As shown in FIG. 10, the servo amplifier 121 controls the FB torque A4 of the servomotor 122 to a value lower than the torque limit value A3 by controlling the drive current to drive the servomotor 122. Thus, the amount of power consumption A5 of the servomotor 122 is controlled to an amount smaller than or equal to the maximum amount of power consumption A2 by controlling the FB torque A4 of the servomotor 122 to the value lower than the torque limit value A3.

The torque limitation configuration described using FIGS. 9 and 10 produces the following advantageous effects. That is, since the torque limit value calculator 112 calculates the torque limit value of the servomotor 122 based on the rotation speed of the servomotor 122 and the amount of power consumable by the servo motor 122 and since the servo amplifier 121 drives the servomotor 122 to the extent that the torque of the servomotor 122 does not exceed the torque limit value, it is possible to limit the torque even when disturbance or the like occurs and thus to reduce power consumption. Further, the margin of power consumption in preparation for disturbance or the like is significantly reduced.

Further, by acquiring the rotation speed of the servomotor 122 in predetermined cycles and calculating a torque limit value in the predetermined cycles based on the acquired rotation speed and the amount of power, the torque limit value calculator 112 calculates a torque limit value corresponding to the rotation speed of the servomotor 122 at any time. Further, if the torque limit value calculator 112 receives power amount information transmitted from the vehicle controller 10 and calculates a torque limit value using the received power amount information, the vehicle controller 10 is able to easily change the power consumable by the servo system. Further, if the vehicle controller 10 transmits power amount information to each of the multiple servo systems, it is possible to efficiently use the main amount of power that is available to be supplied to the vehicle control system 1 and thus to reduce the main amount of power.

The servo system 120 controls the drive of the servomotor 122 using a speed and torque corresponding to the distance between the command position and FB position. However, in the present preferred embodiment, the amount of power available to each delivery vehicle 50 is limited to the corresponding power limit value and therefore the torque of the servomotor 122 of the vehicle is controlled to a torque limit value corresponding to the power limit value. Thus, the FB position may fail to follow the command position and deviate therefrom. The FB position may also deviate from the command position due to disturbance. Further, when the FB position excessively deviates from the command position, the servo system 120 may fail to follow the command position, causing a servo error, or may perform an abnormal operation such as abrupt acceleration to follow the command position. For this reason, in the present preferred embodiment, when the FB position deviates from the command position by a predetermined distance or more, the command position is changed in accordance with the FB position. Thus, an excessive deviation of the FB position from the command position is prevented. Hereafter, a configuration to change the command position as described above will be described.

Figure 11:
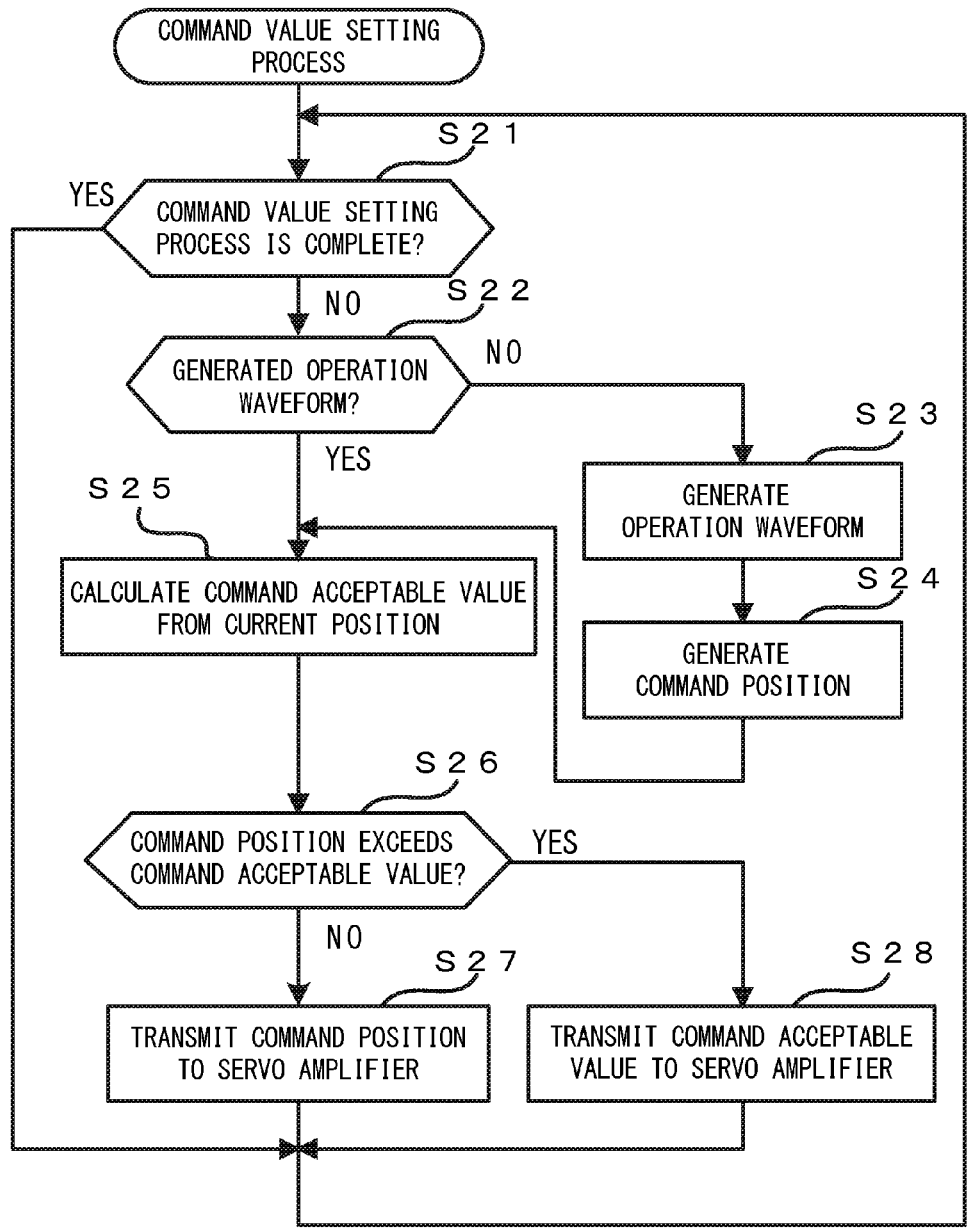
FIG. 11 is a flowchart showing an example of a command value setting process performed by the traveling controller.

FIG. 11 is a flowchart showing an example of a command value setting process performed by the traveling controller. The command value setting process shown in FIG. 9 is repeatedly performed in the same cycles as those in which the traveling controller 110 and servo amplifier 121 communicate with each other (e.g., 0.888 ms or 0.444 ms). As shown in FIG. 11, the command position generator 111a of the command generator 111 in the traveling controller 110 determines whether the command value setting process is complete (step S21). If the command position generator 111a determines that the command value setting process is not complete, it determines whether an operation waveform has been generated (step S22). If the command position generator 111a determines that an operation waveform has been generated, the process proceeds to step S25. In contrast, if the command position generator 111a determines that any operation waveform has not been generated, it generates an operation waveform (step S23). The command position generator 111a then generates a command position commanding the position (the amount of rotation) of the servomotor 122 of the servo system 120 based on the generated operation waveform (step S24).

The acceptable value calculator 113 receives the FB position from the position detector 122A in synchronization with the timing when the command position generator 111a of the command generator 111 generates the command position. The acceptable value calculator 113 then calculates a command acceptable value using the following formula based on the received FB position (step S25). The acceptable value calculator 113 then outputs the calculated command acceptable value to the command generator 111.

Upper limit of command acceptable value=FB position+time integral of command speed+(command speed/position gain)+tolerance (mm)

Lower limit of command acceptable value=FB position+time integral of command speed+(command speed/position gain)−tolerance (mm)

In these formulas, the FB position is the current position as described above; and "time integral of command speed" represents the amount (distance) that the delivery vehicle travels at a command speed in a command position signal outputted at this time. Note that the acceptable value calculator 113 is able to recognize the command speed based on the frequency of the command position outputted from the command generator 111. "Speed command/position gain" represents the amount (distance) corresponding to a delay caused by the position gain. In these formulas, it is assumed that the tolerance is the amount of movement (distance) corresponding to one rotation of the motor.

Since the command value setting process shown in FIG. 11 is performed in the same cycles as the communication cycles, the command generator 111 generates a command position in the same cycles as the communication cycles, and the acceptable value calculator 113 acquires the FB position in synchronization with the generation of the command position. Thus, the acceptable value calculator 113 is able to calculate a command acceptable value based on the FB position, which is close to the actual current position. Further, since the command acceptable value is set to include the amount of movement of the delivery vehicle 50 during one communication cycle, it is possible to set an accurate command acceptable value.

The acceptable value determiner 111b of the command generator 111 determines whether the command position generated based on the operation waveform exceeds the command acceptable value (step S26). If the acceptable value determiner 111b determines that the command position does not exceed the command acceptable value, the command position changer 111c of the command generator 111 outputs (transmits) the command position generated based on the operation waveform to the servo amplifier 121 without changing the command position (step S27). In contrast, if the acceptable value determiner 111b determines that the command position exceeds the command acceptable value, the command position changer 111c of the command generator 111 changes the command position generated based on the operation waveform to the command acceptable value. As seen above, since the command generator 111 is able to change the command position to the command acceptable value at the timing when the command position is generated, it is possible to prevent a delay in changing the command position and to control the drive of the servomotor 122 based on the changed command position. The command generator 111 then outputs (transmits) the command position representing the command acceptable value ("the command acceptable value" in FIG. 11) to the servo amplifier 121 (step S28).

As described above, the traveling controller 110 and servo amplifier 121 communicate with each other in cycles of 0.888 ms, for example. Accordingly, in the transmission processes of steps S27 and S28, the command generator 111 sets the command position signal in the buffer and transmits the command position signal set in the buffer to the servo amplifier 121 at the timing synchronous with the communication cycles.

Figure 12:
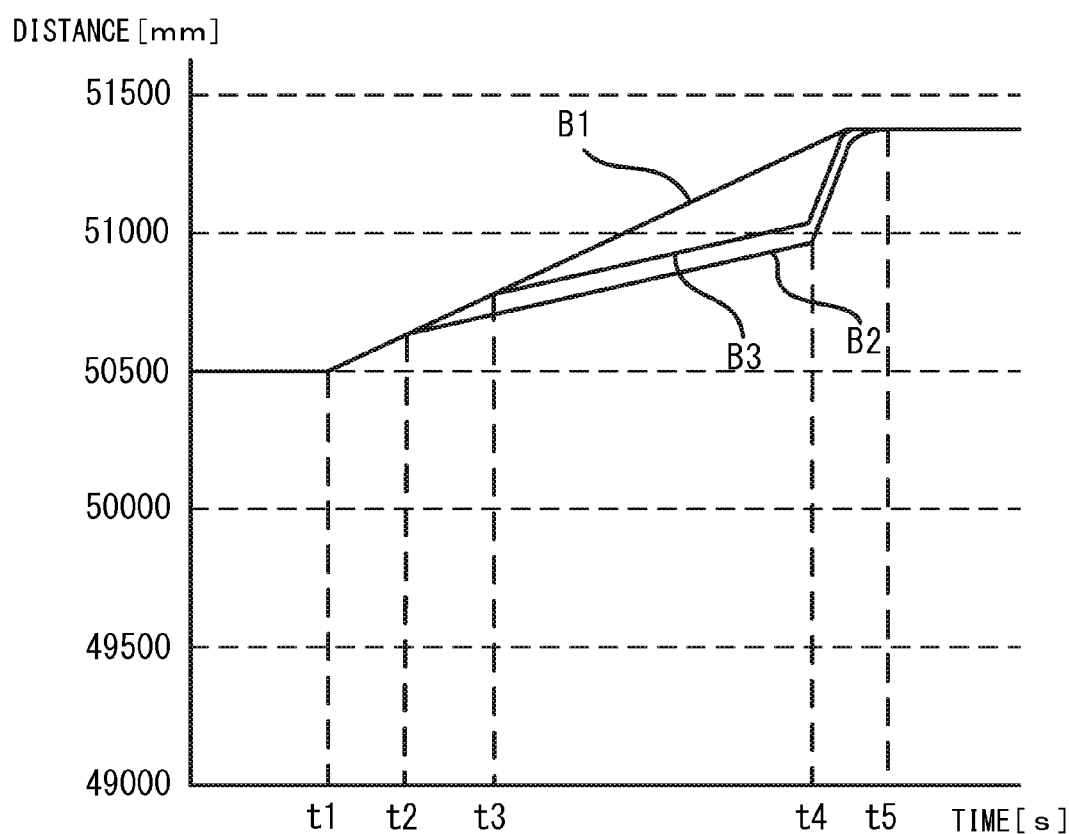
FIG. 12 is a diagram showing waveforms of the unchanged command position, current position, and changed command position.

FIG. 12 is a diagram showing waveforms of the unchanged command position, the current position, and the changed command position. In FIG. 12, the vertical axis represents the distance from a predetermined position (mm), and the horizontal axis represents the time (s). B1 represents the command position generated based on an operation waveform; B2 represents the FB position; and B3 represents the command position changed by the command generator 111, that is, the command acceptable value.

As shown in FIG. 12, at time t1, that is, immediately after the servomotor 122 starts to operate at a predetermined speed, the FB position B2 has yet to deviate from the command position B1. However, from time t2 onward, the FB position B2 gradually deviates from the command position B1 due to the limitation of the torque based on the torque limit value, disturbance, or the like. At time t3, the command position B1 becomes the command acceptable value B3 or more. At this time, the command generator 111 changes the command position B1 to the command acceptable value B3 and outputs the changed command position to the servo amplifier 121. Thus, a deviation of the FB position B2 from the command position (command acceptable value B3) by a predetermined distance or more is prevented. At time t4, the servomotor 122 is driven at an increased speed owing to the relaxation of the power limit value or the disappearance of disturbance and thus the FB position B2 comes close to the command position B1. Subsequently, at time t5, the servomotor 122 comes to a stop, and the FB position B2 reaches the command position B1.

While the limitation of the torque and the change of the command position performed by the traveling controller 110 and servo system 120 have been described with reference to FIGS. 8 to 12, the raise/lower controller 130 and servo system 140, or the transfer controller 150 and servo system 160 may perform the limitation of the torque and the change of the command position in a similar manner.

Specifically, the raise/lower controller 130 may also include the same or approximately the same elements as the command generator 111, the torque limit value calculator 112, and the acceptable value calculator 113 of the traveling controller 110 and perform the processes shown in FIGS. 9 and 11. More specifically, the torque limit value calculator of the raise/lower controller 130 calculates a torque limit value based on the power amount information and the FB speed from the servo amplifier; the servo amplifier limits the torque of the servomotor within the torque limited by the torque limit value calculated by the torque limit value calculator and drives the lifting apparatus; the acceptable value calculator of the raise/lower controller 130 calculates a command acceptable value based on the FB position outputted from the position detector; the acceptable value determiner of the command generator determines whether the command position exceeds the command acceptable value; and if the acceptable value determiner determines that the command position exceeds the command acceptable value, the command position changer of the command generator changes the command position to the command acceptable value.

The transfer controller 150 may also include the same or approximately the same elements as the command generator 111, the torque limit value calculator 112, and the acceptable value calculator 113 of the traveling controller 110 and perform the processes shown in FIGS. 9 and 11. More specifically, the torque limit value calculator of the transfer controller 150 calculates a torque limit value based on the power amount information and the FB speed from the servo amplifier; the servo amplifier limits the torque of the servomotor within the torque limited by the torque limit value calculated by the torque limit value calculator and drives the transfer apparatus; the acceptable value calculator of the transfer controller 150 calculates a command acceptable value based on the FB position outputted from the position detector; the acceptable value determiner of the command generator determines whether the command position exceeds the command acceptable value; and if the acceptable value determiner determines that the command position exceeds the command acceptable value, the command position changer of the command generator changes the command position to the command acceptable value.

As described above, in the present preferred embodiment, the acceptable value calculator 113 calculates a command acceptable value based on the current position of the delivery vehicle 50; the acceptable value determiner 111b of the command generator 111 determines whether the command position exceeds the command acceptable value; and if the command position is determined to exceed the command acceptable value, the command position changer 111c of the command generator 111 changes the command position. Thus, it is possible to prevent the current position from deviating from the command position due to unexpected disturbance, the limitation of the amount of power, or the like. As a result, the following are prevented: a significant deviation of the current position from the command position and thus a failure to follow the command position; the raising of the output torque to follow the command position and thus an increase in power consumption; and the impairment of safety due to an excessive movement.

Further, if the delivery vehicle 50 includes a position detector 122A that detects the current position thereof and the acceptable value calculator 113 calculates a command acceptable value based on the current position outputted from the position detector 122A, it is possible to calculate a command acceptable value based on the correct current position. Further, if the command position changer 111c of the command generator 111 changes the command position to the command acceptable value or a predetermined position within a range which does not exceed the command acceptable value, it is possible to set the command position to a command acceptable value corresponding to the form or the use form of the servo system. Further, if the command position generator 111a of the command generator 111 generates a command position in predetermined cycles and if the acceptable value calculator 113 acquires the current position in synchronization with the generation of the command position, it is possible to calculate a command acceptable value based on the position information, which is close to the actual current position. Further, if the command acceptable value is set to include the amount of movement of the delivery vehicle 50 during one cycle of process cycles same as the communication cycles, it is possible to set an accurate command acceptable value. Further, if the command position changer 111a changes the command position at the timing when the command position generator 111a generates the command position, it is possible to prevent a delay in changing the command position and to control the drive of the servomotor 122 based on the changed command position.

While preferred embodiments of the present invention have been described, the present invention is not limited to the elements and the like shown in the drawings. Changes can be made to the elements and the like without departing from the functions, purposes, and the like thereof. While the area in which the delivery vehicles 50 are able to move is preferably divided into the two feeding areas, 20A and 20B, in the above embodiment, the area may be divided into three or more feeding areas, for example.

While the respective feeding areas preferably correspond to the same system in the above preferred embodiments, the feeding areas may correspond to different systems. For example, one feeding area may correspond to a system using a stacker crane, and the other feeding area may correspond to a system using a ceiling traveling vehicle or the like, which differs from a stacker crane.

While, in the above preferred embodiments, the feeding areas are areas in which there are installed production facilities and the like for which delivery vehicles 50 actually perform delivery tasks, there may be an area in which multiple delivery vehicles 50 are placed on standby (standby area). In this case, the delivery vehicles 50 are dispatched from this standby area to a feeding area. Since the delivery vehicles 50 in this standby area need power to perform operations such as traveling, the standby area is also assigned the main amount of power.

The following configuration may also be used: video or images of the operating statuses of the delivery vehicles 50 is captured using an imaging device such as a video camera; the operating statuses of the delivery vehicles 50 are analyzed based on the video or images using a method such as pattern matching; and the vehicle controller 10 acquires the analysis results as operation information.

While the torque limit value calculator 112 is included in the traveling controller 110 in the above preferred embodiments of the present invention, it may be included in the servo amplifier 121.

While the command position is changed to the command acceptable value in the above preferred embodiments of the present invention, the command position may be changed to a position which prevents the servo system 120 from failing to follow the command position and thus causing a servo error or prevents the servo system 120 from performing an abnormal operation such as abrupt acceleration to follow the command position. Accordingly, the command position may be changed to a predetermined position within a range which does not exceed the command acceptable value.

While, in the above preferred embodiments, the upper and lower limits of the command acceptable value preferably are calculated using the formulas: upper limit of command acceptable value=FB position+time integral of command speed+(command speed/position gain)+tolerance (mm), and lower limit of command acceptable value=FB position+time integral of command speed+(command speed/position gain)−tolerance (mm). However, such a calculation is merely one non-limiting example, the command acceptable value may be calculated as a position which prevents the servo system 120 from failing to follow the command position and thus causing a servo error or prevents the servo system 120 from performing an abnormal operation such as abrupt acceleration to follow the command position.

While it is assumed in the above preferred embodiments that the non-contact feeding system preferably is an electromagnetic induction-type system, the system may be an electromagnetic resonance-type system, which uses a resonance phenomenon of an electromagnetic field. The system may also be a contact-type feeding system using a trolley or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A delivery vehicle comprising:
    a command position generator that generates a command position to move the delivery vehicle to a target position by driving a servomotor;
    an acceptable value calculator that calculates a predetermined acceptable value based on a current position;
    an acceptable value determiner that determines whether the command position exceeds the predetermined acceptable value calculated by the acceptable value calculator; and
    a command position changer that changes the command position when the acceptable value determiner determines that the command position exceeds the predetermined acceptable value.

2. The delivery vehicle of claim 1, further comprising a position detector configured to detect the current position, wherein the acceptable value calculator calculates the predetermined acceptable value based on the current position outputted from the position detector.

3. The delivery vehicle of claim 1, wherein the command position changer changes the command position to the predetermined acceptable value or a predetermined position within a range which does not exceed the predetermined acceptable value.

4. The delivery vehicle of claim 1, wherein
the command position generator generates the command position in predetermined cycles; and
the acceptable value calculator acquires the current position in synchronization with generation of the command position.

5. The delivery vehicle of claim 4, wherein the predetermined acceptable value includes the amount of movement during one of the predetermined cycles.

6. The delivery vehicle of claim 1, wherein the command position changer changes the command position at a timing when the command position generator generates the command position.

7. A method to control driving of a delivery vehicle, the method comprising:
generating a command position to move the delivery vehicle to a target position by driving a servomotor;
calculating a predetermined acceptable value based on a current position;
determining whether the command position exceeds the predetermined acceptable value; and
changing the command position when it is determined that the command position exceeds the predetermined acceptable value.

8. A non-transitory computer-readable medium including a computer program that controls driving of a delivery vehicle, the program causing a computer to perform:
generating a command position to move the delivery vehicle to a target position by driving a servomotor;
calculating a predetermined acceptable value based on a current position;
determining whether the command position exceeds the predetermined acceptable value calculated in the acceptable value calculation process; and
changing the command position when it is determined in the acceptable value determination process that the command position exceeds the predetermined acceptable value.

9. The delivery vehicle of claim 1, wherein the command position changer changes the command position so as to advance the command position.

10. The delivery vehicle of claim 1, wherein the command position changer changes the command position to a value calculated by adding at least an amount that the delivery vehicle travels at a command speed to the current position.

11. The delivery vehicle of claim 3, wherein the command position changer changes the command position to a value calculated by adding at least an amount that the delivery vehicle travels at a command speed to the current position and subtracting a tolerance.

\* \* \* \* \*